United States Patent [19]
Miller

[11] Patent Number: 5,743,504
[45] Date of Patent: Apr. 28, 1998

[54] VESSEL HOLDING ADAPTER

[76] Inventor: Joseph A. Miller, 35 Chimney Cove, Hilton Head Island, S.C. 29928

[21] Appl. No.: 655,689

[22] Filed: Jun. 3, 1996

[51] Int. Cl.$^6$ .................................................. A47K 1/08
[52] U.S. Cl. ...................... 248/311.2; 224/42.38; 224/926; 297/188.01
[58] Field of Search .................. 248/311.2, 312, 248/309.1, 310, 316.6, 316.2; 206/139; 224/926, 42.38; 297/440.13, 188.01; 47/39, 40, 40.1; 211/33

[56] References Cited

U.S. PATENT DOCUMENTS

| | | | |
|---|---|---|---|
| 2,107,178 | 2/1938 | Fackler | 211/33 |
| 2,215,411 | 9/1940 | Sebring | 248/311.2 |
| 4,948,080 | 8/1990 | Jack | 248/311.2 |
| 5,052,649 | 10/1991 | Hunnicutt | 248/311.2 |
| 5,366,189 | 11/1994 | Thompson | 248/97 |
| 5,533,700 | 7/1996 | Porter | 248/311.2 |

*Primary Examiner*—Ramon O. Ramirez
*Attorney, Agent, or Firm*—Willard M. Hanger

[57] ABSTRACT

An adapter for receiving a vessel of one size and configured for retaining placement of the one size vessel in a receptacle cavity dimensioned to hold a different size vessel. The adapter comprises a pair of similarly configured segments each having a flat lower portion of a width sized for placement transversely within the receptacle cavity integral with and depending below an upper portion having a plurality of upwardly extending arms separated a distance as accommodates placement of the one size vessel between the arms. The respective adapter segments each have similarly dimensioned slots midway of and extending longitudinally approximately one-half the height of the flat lower portion, the slot in one adapter segment of the pair extending upwardly from the bottom edge of the one segment and the slot in the other adapter segment of the pair extending downwardly from the top edge of the other segment. The adapter segments form a unitary adapter device with the respective adapter segments in nesting engagement transversely of each other upon arranging the respective segments such that the slots of each segment of the pair closely straddles approximately one-half of the lower portion of the other of the pair of segments.

9 Claims, 1 Drawing Sheet

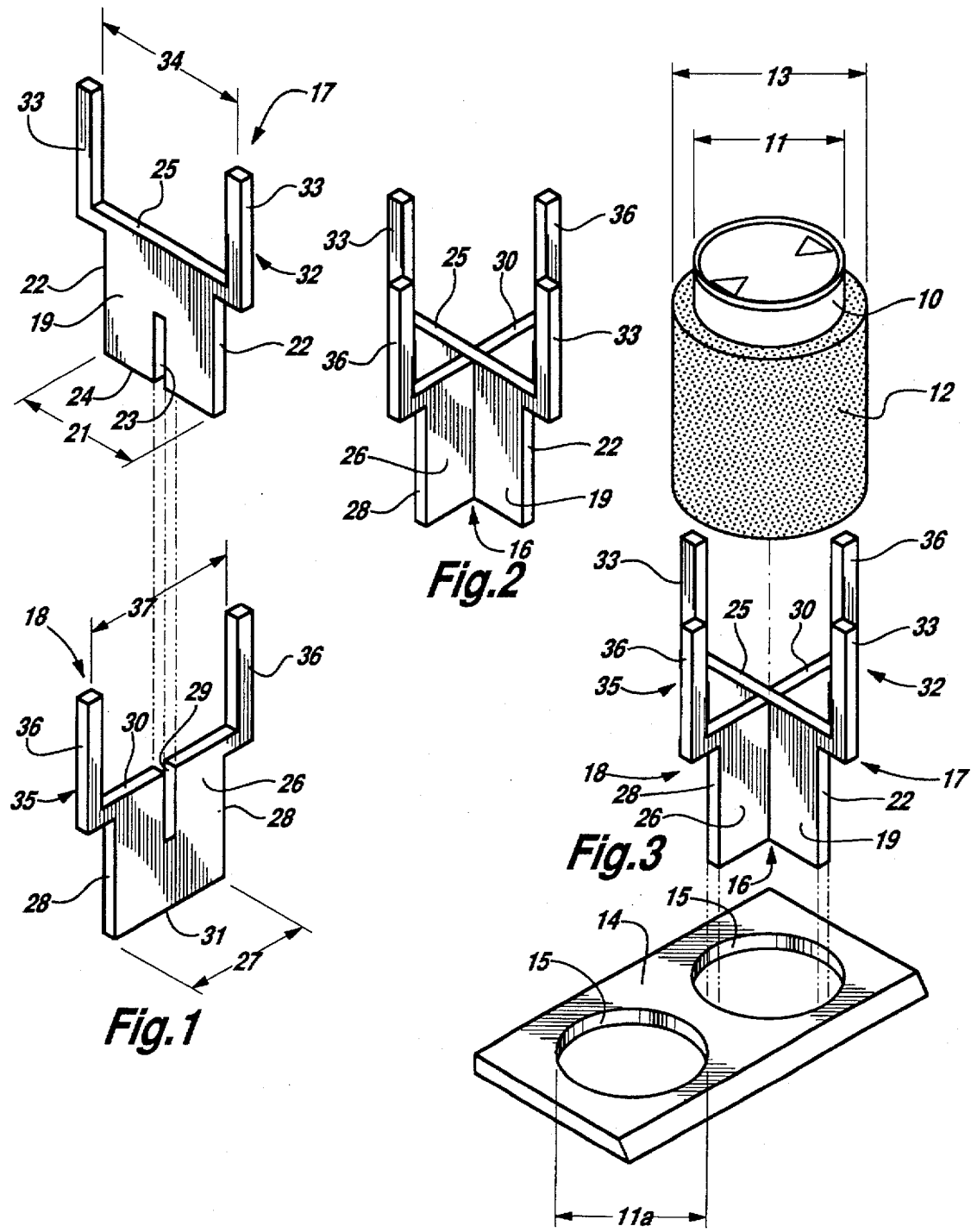

5,743,504

VESSEL HOLDING ADAPTER

BACKGROUND OF THE INVENTION

This invention relates broadly to an adapter device for retaining a vessel or container in a receptacle of which the holding cavity is a different size than that of the container. Golf carts, automobiles, boats, lawn furniture and the like frequently have container receptacles of which the cavities are sized to receive and hold standard-size containers of beverages or other edibles. The receptacles are frequently sized to hold standard-size 12 ounce cans of beer or beverages or standard-size plastic cups for coffee and the like. Consumers of the beverages frequently wish to retain the chill or heat of the beverage in the container by placing the container within an insulated holder of foam rubber or plastic material that are widely available.

Adapters for retaining oversized vessels such as insulated beverage holders encasing standard-size containers are known and available, such as the adapter disclosed in U.S. Pat. No. 5,052,649. However, known adapters normally require permanent or semi-permanent installation, are bulky, not readily portable, and are particularly inconvenient for golfers to use in conjunction with rented golf carts when the adapter must be small and highly portable of a nature as will fit in a golf bag or pocket of the golfer.

SUMMARY OF THE INVENTION

An object of this invention is to provide a small and compact adapter device which allows holding a container in a receptacle cavity dimensioned to hold a different size container.

Another object of the invention is to provide a small, compact adapter for retention of a standard-size container encased within a larger diameter holder in a receptacle cavity sized to hold a standard-size container.

A further object of the invention is to design an adapter comprising easily assembled small components that, when assembled, allow placement of an oversized container holder in a standard-size receptacle cavity.

Yet still a further object of the invention is to provide golfers with a small, compact, disassemblable adapter for placement of a standard-size beverage container encased within an insulated holder in the container receptacle of a golf cart.

These objects have been achieved by an adapter in the form of a pair of flat adapter segments, each having a lower portion with a width dimension between opposite vertical side edges sized for placement of the segment lower portion transversely within a receptacle cavity dimensioned to hold a standard-size container and an upper portion having a pair of arms extending vertically upwardly of the lower portion adjacent the lower portion opposite side edges with the separation between the respective arms being dimensioned for placement therebetween of containers of a non-standard size. The respective adapter segments each contain a slot midway of the respective lower portions extending partially longitudinally of the length of each lower portion from the bottom edge of the lower portion of one adapter segment and from the upper edge of the lower portion of the other adapter segment, the slots being dimensioned to permit transverse nesting engagement of the respective segments with the slot of each respective adapter segment straddling a lower portion of the other adapter segment.

BRIEF DESCRIPTION OF THE DRAWINGS

FIG. 1 is an exploded, perspective view of the invention illustrating the segments of the adapter in a disassembled and separated position.

FIG. 2 is a perspective view of the adapter segments of FIG. 1 in an assembled position.

FIG. 3 is an exploded, perspective view of the assembled adapter of FIG. 2 in relation to a container encased in an insulated holder and a container receptacle.

DESCRIPTION OF THE PREFERRED EMBODIMENT

Referring first to FIG. 3, illustrating the adapter in relation to an insulating holder encased container and a receptacle with a cavity sized to retain the container, a standard-size container 10 of a diameter 11 is encased in an insulated holder 12 having an exterior diameter 13 larger than that of the container 10. A receptacle 14, commonly found in golf carts, automobiles and the like, has a cavity 15 of a diameter 11a dimensioned for placement therewithin of a standard-size container 10. The assembled adapter 16, more fully described below, comprises an upper portion 32 of vertically arranged arms 33, 36 between which the holder 12 and encased container 10 can be placed and transversely arranged lower portions 19, 26 sized for placement into the cavity 15 of the receptacle 14.

Referring now to FIGS. 1 and 2, the assembled container 16 comprises a first adapter segment 17 and a second adapter segment 18, preferably of equal thickness and identical exterior contours to be subsequently described. The first adapter segment 17 has a lower portion plate 19 of which the width dimension 21 between opposite side edges 22 is sized for placement within and transversely of the receptacle cavity 15. The first segment lower portion plate 19 contains a slot 23 midway between the plate side edges 22 that extends upwardly from the bottom edge 24 of the lower portion plate longitudinally approximately one-half the distance between the bottom edge 24 and top edge 25 of the plate 19. The second adapter segment 18 similarly has a lower portion plate 26 in which the width dimension 27 between opposite side edges 28 is sized for placement within and transversely of the receptacle cavity 15. The second adapter segment lower portion plate 26 also contains a slot 29 midway between side edges 28 of the plate 26 that extend downwardly from the plate top edge 30 longitudinally approximately one-half the distance between the top edge 30 and bottom edge 31 of the lower portion plate 26.

The first adapter segment 17 has a container holder retaining upper portion 32 comprising a pair of elongated arms 33 extending vertically upward of and integral with opposite side portions of the first adapter segment lower portion plate 19 in which the separation 34 between the interior of the arms 33 is sized for placement therebetween of an insulating holder 12 of diameter 13. The second adapter segment 18 also has a container holder retaining upper portion 35 comprising a pair of elongated arms 36 extending vertically upward of and integral with opposite side portions of the second adapter segment lower portion plate 26 in which the separation 37 between the interior of the arms 36 is also sized for placement therebetween of an insulating holder 12 of diameter 13.

For assembly of the adapter 16, the first adapter segment 17 is positioned above and transversely of the second adapter segment 18 with the slots 23 and 29 of the respective adapter segments in alignment as indicated in FIG. 1. The pair of adapter segments 17, 18 are brought together while maintaining the slots in vertical alignment until the slot 23 of the first adapter segment 17 straddles the lower half of the second adapter segment lower portion plate 26 and of the slot 29 of the second adapter segment 18 straddles the upper half of the first adapter segment lower portion plate 19, thereby placing the pair of adapter segments into locking engagement transversely of each other. The assembled adapter 16, comprising the engaged adapter segments 17, 18 with the transversely arranged lower portion plates 19, 26, is lowered to place the plates 19, 26 of the assembled adapter into the cavity 15 of the receptacle 14, whereby the container 10 encased in the holder 12 is securely held by the receptacle 14. Since the slots of each adapter segment straddle lower portions of opposite adapter segments, the adapter segments are more conveniently of the same thickness and the slots of each segment are of equal width.

Whereas the described embodiment is suitable for holding a vessel having a larger cross-section than the receptacle cavity, an obvious variation of the described embodiment suitable for holding a vessel having a smaller cross-section than that of the receptacle cavity would be to arrange the arms of the upper portion of the respective adapter segments with a separation which would be less than the width of the lower portions. In the described preferred embodiment, the respective adapter segments of each pair are identical, with the exception of the location of the slots. Such a configuration is advantageous for economically producing the invention of the adapter since the two component adapter segments can be produced in the same stamping machine or mold, and the slots in the respective segments separately cut in reverse direction from opposite end edges. A suitable material is a ¼-inch hard plastic.

It should be understood that the foregoing disclosure illustrates one typical preferred embodiment of the invention and that numerous modifications or alterations may be made therein without departing from the spirit and scope of the invention as set forth in the appendant claims.

What is claimed is:

1. An adapter for retaining a standard-size container encased in a larger size holder in a receptacle cavity sized to hold a standard-size container comprising a pair of adapter segments each having a cavity fitting lower portion integral with and depending below a holder retaining upper portion, said lower portion comprising a plate with a width dimension between opposite side edges sized for placement of said plate within said receptacle cavity transversely thereof, said upper portion comprising a pair of arms each extending upwardly of a top edge of said lower portion plate beyond respective side edges of said plate with a separation between opposite facing surfaces of said arms being a distance accommodating placement therebetween of said larger size holder, each adapter segment containing a slot extending partially longitudinally of said adapter segment lower portion plate midway of said plate side edges with the slot in one adapter segment of said pair extending upwardly from the bottom edge of the lower portion plate of said one adapter segment and the slot in the other adapter segment of said pair extending downwardly from the top edge of the lower portion plate of said other adapter segment, whereby said adapter segments of said pair form a unitary adapter device with the respective adapter segments in nesting engagement transversely of each other upon arranging the adapter segments with the slot of each adapter segment of said pair straddling a portion of the lower portion plate of the other of the adapter segments of said pair.

2. The adapter of claim 1 wherein the slot of each adapter segment extends substantially half the distance between the top and bottom edges of said lower portion plate and the slot in each adapter segment of said pair has a width sized to closely straddle the lower portion plate of the other of the adapter segments of said pair.

3. The adapter of claim 1 wherein each adapter segment of said pair is identical other than the stipulated location of the slots in the lower portion plates of the respective adapter segments of said pair.

4. An adapter fitting into a receptacle cavity for holding a container having a cross sectional dimension larger than that of the receptacle cavity comprising a pair of support members each having a container holding top portion and a cavity accommodating lower portion comprising a plate having a mid-width central region extending between upper and lower surfaces of said plate and containing a slot extending substantially half the vertical height of said plate central region with said slot contained in said lower portion plate of one support member of said pair extending downwardly from said plate upper surface and upwardly from said plate lower surface of the other support member of said pair wherein, by arranging said pair of support member plates transversely of each other with said slot contained in each one of said support member plates of said pair straddling an unslotted central region of the other one of said support member plates of said pair, said support members are joined into a mutually transversely extending cruciform arrangement, characterized in that:

each said cavity accommodating lower portion plate has a bottom section bounded by side edge surfaces protruding upwardly from respective ends of a transversely extending lower surface of said plate with a separation between said plate lower surface respective ends and said plate bottom section side edge surfaces substantially conforming to the cross sectional dimension of the receptacle cavity as accommodates placement of said plate lower portion bottom section into the receptacle cavity transversely thereof and each said container holding top portion comprises a pair of arms projecting upwardly of respective ends of an upper surface of said lower portion plate extending transversely of said plate beyond said plate bottom section side edge surfaces with a separation between said plate upper surface respective ends and inner facing surfaces of said arms substantially conforming to the cross sectional dimension of the container as accommodates containment of the container therewithin.

5. The adapter of claim 4 characterized in that said plate upper and lower surfaces are flat surfaces extending horizontally transversely of said plate.

6. The adapter of claim 5 characterized in that said support members of said pair are planar members of equal thickness and have identical external contours.

7. A vessel holding adapter fitting within a receptacle cavity having a cross sectional dimension less than that of the vessel comprising a first and a second adapter segment, each said adapter segment comprising a flat plate having a bottom section contained between opposite vertically extending side edge surfaces spaced apart substantially the cross sectional dimension of the receptacle cavity and extending upwardly from respective ends of a transversely extending lower surface of said plate and a pair of arms extending upwardly from respective ends of an upper surface of said plate extending transversely of said plate beyond said bottom region side edge surfaces with a separation between said plate upper surface respective ends and inner facing surfaces of said arms substantially conforming to the cross sectional dimension of the vessel, said first adapter segment plate containing a slot midway of its width extending from said plate upper surface substantially half the distance between said plate upper and lower surfaces and said second adapter segment plate containing a slot midway of its width extending from said plate lower surface substantially half the distance between said plate lower and upper surfaces, whereby arranging said adapter segments transversely of each other with the slot of said first adapter segment plate straddling the region of said second adapter segment plate above said second adapter segment plate slot and the slot of said second adapter segment plate straddling the region of said first adapter segment plate above said first adapter segment plate slot said adapter segments are joined into a transversely extending cruciform assembly of which the lower portion fits within the receptacle cavity.

8. The adapter of claim 7 wherein said flat plate upper and lower surfaces are planar surfaces extending horizontally transversely of said plate.

9. The vessel holding assembly of claim 8 wherein said first and second adapter segments are flat members of equal thickness and have identical external contours.

* * * * *